(12) United States Patent
Sagal et al.

(10) Patent No.: US 9,332,621 B2
(45) Date of Patent: May 3, 2016

(54) LED LAMPS WITH ENHANCED WIRELESS COMMUNICATION

(71) Applicant: THERMAL SOLUTION RESOURCES, LLC, Narragansett, RI (US)

(72) Inventors: E. Mikhail Sagal, Wakefield, RI (US); Gary R. Arnold, North Providence, RI (US)

(73) Assignee: THERMAL SOLUTION RESOURCES, LLC, Narragansett, RI (US)

( * ) Notice: Subject to any disclaimer, the term of this patent is extended or adjusted under 35 U.S.C. 154(b) by 0 days.

(21) Appl. No.: 14/306,297

(22) Filed: Jun. 17, 2014

(65) Prior Publication Data

US 2014/0292194 A1    Oct. 2, 2014

Related U.S. Application Data

(63) Continuation of application No. PCT/US2013/020116, filed on Jan. 3, 2013.

(60) Provisional application No. 61/583,917, filed on Jan. 6, 2012.

(51) Int. Cl.
*H01Q 1/26* (2006.01)
*H05B 37/02* (2006.01)
(Continued)

(52) U.S. Cl.
CPC .............. *H05B 37/0272* (2013.01); *F21K 9/13* (2013.01); *F21K 9/1355* (2013.01);
(Continued)

(58) Field of Classification Search
CPC ................................. F21V 29/002; F21K 9/13
USPC ................................ 362/294, 373; 315/32, 34
See application file for complete search history.

(56) References Cited

U.S. PATENT DOCUMENTS

| | | | | |
|---|---|---|---|---|
| 8,235,549 | B2 * | 8/2012 | Gingrich, III | ........... F21V 15/01 362/249.02 |
| 8,974,080 | B2 * | 3/2015 | Zaderej | ..................... F21K 9/00 362/249.02 |

(Continued)

FOREIGN PATENT DOCUMENTS

| | | |
|---|---|---|
| CN | 1849707 A | 10/2006 |
| CN | 201661913 U | 12/2010 |

(Continued)

OTHER PUBLICATIONS

International Search Report received in PCT/US2013/020116 dated Mar. 22, 2013.

(Continued)

*Primary Examiner* — Jason M Crawford
(74) *Attorney, Agent, or Firm* — McLane Middleton, Professional Association

(57) ABSTRACT

An LED lighting device includes a light emitting assembly including at least one LED and a wireless network interface connecting the LED lighting device to a network. The wireless network interface includes a RF transceiver. An antenna is in electrical communication with the RF transceiver. A thermally conductive housing receives the light emitting assembly, the thermally conductive housing in thermal communication with the at least one LED. In one aspect the thermally conductive housing is formed of a thermally conductive and electrically nonconductive material. In another aspect, the thermally conductive housing includes a first portion attached to a second portion, wherein the first portion is formed of a first, thermally conductive material and defines an interior cavity receiving the wireless network interface. The second portion is formed of a second, electrically nonconductive material and defines an aperture allowing optical output of the at least one LED to pass therethrough.

20 Claims, 7 Drawing Sheets

(51) Int. Cl.
    *F21K 99/00*     (2016.01)
    *F21V 25/00*     (2006.01)
    *H05B 33/08*     (2006.01)
    *F21V 23/04*     (2006.01)
    *F21V 23/00*     (2015.01)
    *F21V 29/77*     (2015.01)
    *F21V 29/85*     (2015.01)
    *F21V 29/87*     (2015.01)
    *F21Y 101/02*     (2006.01)
    *F21Y 103/02*     (2006.01)

(52) U.S. Cl.
    CPC .......... *F21V 23/006* (2013.01); *F21V 23/0435* (2013.01); *F21V 23/0471* (2013.01); *F21V 25/00* (2013.01); *F21V 29/773* (2015.01); *F21V 29/86* (2015.01); *F21V 29/87* (2015.01); *H05B 33/0803* (2013.01); *H05B 33/0854* (2013.01); *H05B 37/0218* (2013.01); *H05B 37/0227* (2013.01); *F21Y 2101/02* (2013.01); *F21Y 2103/022* (2013.01)

(56) References Cited

U.S. PATENT DOCUMENTS

| | | |
|---|---|---|
| 2002/0159235 A1 | 10/2002 | Miller et al. |
| 2004/0222433 A1 | 11/2004 | Mazzochette et al. |
| 2007/0007898 A1* | 1/2007 | Bruning ............. H05B 33/0821 315/34 |
| 2007/0121326 A1 | 5/2007 | Nall et al. |
| 2007/0195939 A1 | 8/2007 | Sink et al. |
| 2010/0014289 A1* | 1/2010 | Thomas ................. F21V 15/01 362/235 |
| 2010/0327766 A1* | 12/2010 | Recker ...................... H02J 9/02 315/291 |
| 2012/0139417 A1* | 6/2012 | Mironichev ....... H05B 33/0842 315/86 |
| 2012/0146505 A1* | 6/2012 | Jonsson ............. H05B 33/0857 315/50 |
| 2012/0274208 A1* | 11/2012 | Chen ........................ H01Q 1/44 315/34 |
| 2012/0293652 A1* | 11/2012 | Farmer ................... F21V 29/20 348/143 |

FOREIGN PATENT DOCUMENTS

| | | |
|---|---|---|
| JP | 2011-228130 A | 11/2011 |
| WO | 2010140136 A1 | 12/2010 |
| WO | 2013103698 A1 | 7/2013 |

OTHER PUBLICATIONS

Matweb, Material Property Data. 1996-2013. [retrieved on Feb. 19, 2013]. Retrieved from the Internet <URL: http://www.matweb.com/searñ/datasheet.aspx?matguid=89754e8bb26148d083c5ebb05a0cbff1&ckck=1> entire document.

European Search Report and Opinion dated Nov. 23, 2015, received in EP13733848.9.

* cited by examiner ion No. PCT/US2013/020116 having
LED LAMPS WITH ENHANCED WIRELESS COMMUNICATION

CROSS REFERENCE TO RELATED APPLICATIONS

This application is a continuation of currently pending international application No. PCT/US2013/020116 having an international filing date of Jan. 3, 2013 and designating the United States, the international application claiming the right of priority based upon prior filed U.S. provisional application No. 61/583,917 filed Jan. 6, 2012. The entire contents of the aforementioned international application and the aforementioned provisional application are incorporated herein by reference.

BACKGROUND

Today wireless communication is becoming more and more prevalent in everyday life. One area that wireless communication is beginning to take hold is in general lighting such as LED lighting. LED lighting is already advantageous over traditional incandescent or compact fluorescent lighting in that they do not contain mercury, last 25,000 to 50,000 hours depending on design, are much more efficient, with efficacies approaching 100 lumens/watt vs. 10 lumens/watt for incandescent and 50 lumens/watt for compact fluorescent. LED lighting is also advantageous in that LED devices offer greater lighting flexibility, are instant on or off and can have many more controls in them, such as those related to smart technologies. These smart technologies may be enhanced by incorporating wireless communication into the lamps and luminaries. By incorporating wireless technology into the lights, they can communicate directly to gateways and communication centers that have the ability to monitor things such as real time electricity consumption, control when a light goes on, adjust its light output based on the day light level and time of day, and allow consumers to control the lights remotely, e.g., via their handheld devices such as smart phones, PDA's, portable computing devices such as tablets including iPhones/iPads, Android devices, etc., personal computers for home and commercial applications and other networked or Internet enabled devices. These LED lighting devices in turn may also be used as Wi-Fi hot spots by incorporating the electronics necessary for such communication controls into the device itself.

Wireless communication requires an IP (Internet Protocol) enabled device to communicate. Companies are developing gateways and software that can communicate to IP enabled devices and control/monitor them. Google home is one example of software that is under development that runs on wireless devices that can communicate with IP enabled LED lights so one can control and communicate with them. In order for the IP enabled device to communicate with the network or gateway, wirelessly, it has to have a radio frequency network interface installed in it as well as an antenna to communicate the IP communications to the network and the computers controlling it using radio frequency (RF) signals. These antennas are typically required for radio communication to and between devices, and several protocols are available depending on the infrastructure used, such as Wi-Fi (IEEE 802 wireless standards), TCP/IP, ZigBee, or other wireless protocols that communicate with a router or gateway device that in turn communicates to the Internet. An exemplary networked system incorporating a wireless LED lighting device in accordance with the present disclosure appears in FIG. 7.

High powered LED lighting typically requires heat sinking for thermal management, which may be provided by aluminum or metal heat sinks which also act as part of the LED enclosure. These metal heat sinks can interfere and cause radio interference with the drive electronics and antennas and wireless radios used to communicate the IP and wireless protocol communications. Antennas must be placed a minimum distance away from the metal heat sink/enclosure so that they do not interfere with the wireless signals. This interference can cause incomplete information transmissions which will generate faulty control/monitoring responses as well as reduced wireless communication range which can reduce the effectiveness of the wireless performance and cause incomplete directional coverage (from 360 degrees around) as well as shorten the distance the antenna can "hear" or "send" a signal.

Other problems are antenna's conforming to the American National Standards institute (ANSI) or other standards setting body lamp size restrictions and overall industry shape guidelines for designing product. The challenge is in placing the antenna a sufficient distance from the metal housing without interfering with the illumination from the lamp. Many current applications have the antenna attached to or near the optic/lens, which can cause a shadow from the antenna to obstruct the illumination of the LED light, thereby causing an undesirable light coverage. This additionally makes the assembly and manufacturing of the LED device difficult and problematic.

FIGS. 1A, 1B and 4 depict two alternative LED devices, 111 and 211, respectively, where the wireless antenna has been assembled in a manner consistent with EMI interference materials. It is done in a way that Antenna 107 and 207 protrude right into the middle of the optic with spacing 110 and 210 of approximately 10 mm away from the LED housing 101 and 201, the metal core circuit board 104 and 204, and other metal or EMI interfering materials in the LED devices, although in some cases, the distance could be as little as 3-5 mm or more depending on design. Especially in the case of smaller lamps, such as GU10, A19's, Candelabras and the MR-16 embodiment 211 appearing in FIG. 4, the optic area 106 and 206 and the LED(s) 105 and 205 as shown in both FIGS. 1A, 1B and 4 could be found to be partially obstructed by the wireless antennas 107 and 207. The wireless antenna is coupled to an RF radio 103 and 203 via a coax cable 112 and 212. The RF radio is electrically connected to the LED driver 102 and 202. In these depictions, the MCPCB is placed onto the heat sink with thermal interface, 108 and 208. The MCPCB in the prior art is not overmolded and is securely fastened by screws 109 and 209 to the housing 101 and 201. Given the problems with the present state of art design and manufacturing of LED devices combined with the radio transmissions of the wireless devices, our present disclosure we will show improved LED device designs and manufacturing processes that resolve these problems.

SUMMARY

An LED lighting device includes a light emitting assembly including at least one LED and a wireless network interface coupled to the light emitting assembly and connecting the LED lighting device to a network. The wireless network interface includes a radio frequency transceiver. An antenna is in electrical communication with the radio frequency transceiver. A thermally conductive housing receives the light emitting assembly, the thermally conductive housing being in thermal communication with the at least one LED. In one aspect the thermally conductive housing is formed of a thermally conductive and electrically nonconductive material. In another aspect, the thermally conductive housing includes a first portion attached to a second portion, wherein the first portion is formed of a first, thermally conductive material and defines an interior cavity receiving the wireless network interface. The second portion formed of a second, electrically nonconductive material and defines an aperture allowing optical output of the at least one LED to pass therethrough during operation.

DETAILED DESCRIPTION OF THE PREFERRED EMBODIMENTS

Figure 1A:
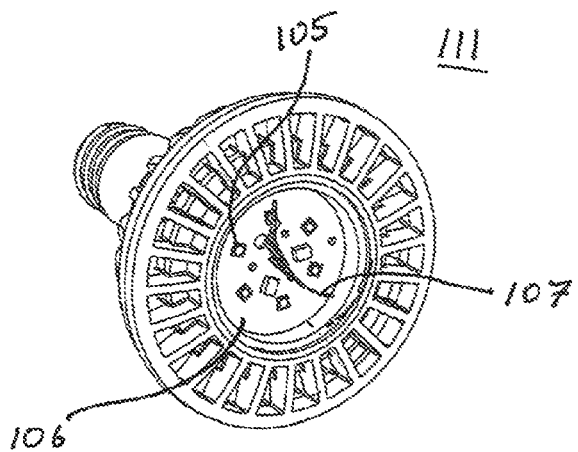
FIGS. 1A, 1B and 4 depict two prior art LED devices wherein the wireless antenna has been assembled in a manner consistent with EMI interference materials.
Figure 1B:
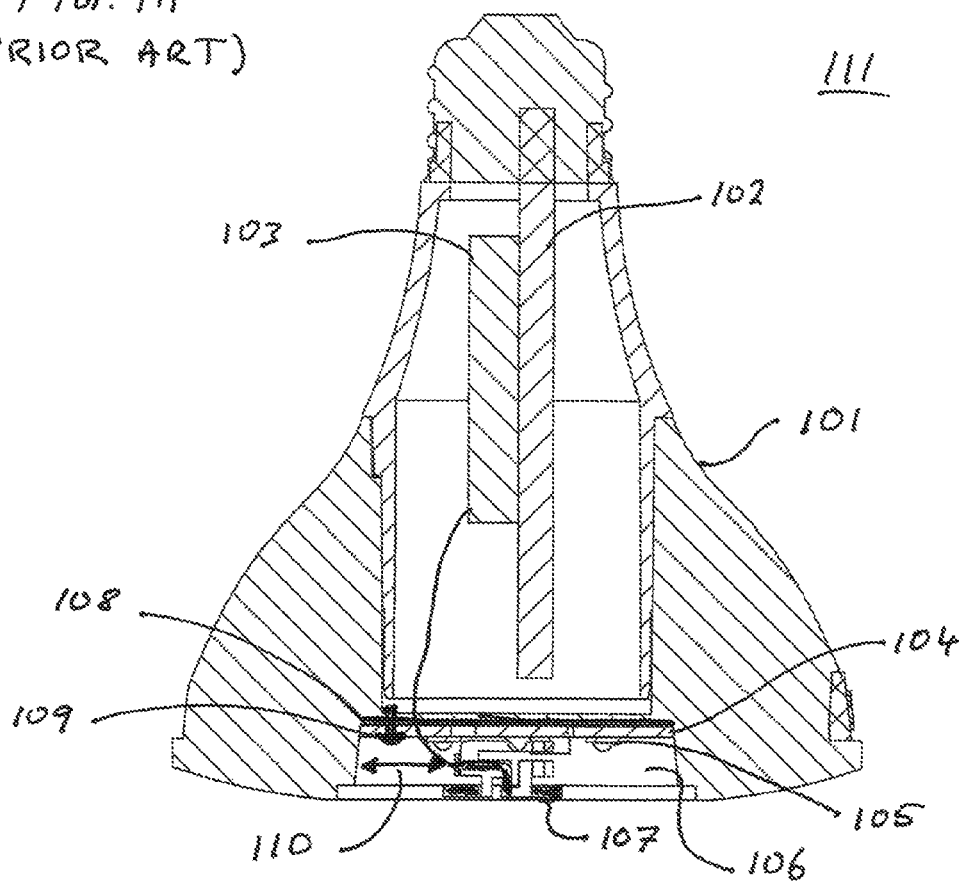

The present disclosure describes an improved wireless LED lighting device design and method of fabricating the same.

By making the heat sink housing for thermal management of the LED lighting device out of a material that is not electrically conductive, has minimized EMI shielding and that is non-metal based, we create a design whereby the antenna can be optimally placed, manufacturing and design freedom of the lamp and antenna assembly is greatly enhanced, any interference issues with wireless radio communication is reduced or eliminated and we significantly improve on the antenna efficiency, range of communication to deliver a state of the art lamp with limited to no Internet protocol, antenna or radio communication interference issues.

The present disclosure provides for simplified construction of the LED device by making it possible to mount the antenna directly onto or into the LED device housing during manufacturing. It further provides materials for an LED lighting device housing and thermal heat sink that have optimized EMI characteristics tailored to complement the signals of wireless antennas used for communication in LED devices. This not only allows for more design freedom of the LED device as the wireless antenna now can be placed in locations on the LED device that do not obstruct light output of the LED device due to the need to position the antenna away from the traditional metallic/electrically conductive materials with EMI interference properties, but also improves the range of the wireless antenna due to a reduction in EMI and frequency interferences.

The present disclosure provides a wireless LED lighting device wherein the antenna may be placed immediately next to or upon the LED device housing or heat sink or bezel, embedded inside the housing or heat sink or bezel, plated onto or etched into the housing or heat sink or bezel, or otherwise positioned so as to keep the antenna out of the optical area of the LED device where it could either block light emissions of the LED or protrude in a way that did not meet the ANSI LED device bulb form factor standards, all while maintaining a wireless efficiency of greater than 20%, preferably greater than 35% and more preferably greater than 50% with limited to no obstruction of signal from any direction (360 degrees around). In addition, LED devices having an antenna array comprising two or more antennae are also contemplated, since any number of antennae may be provided without interfering with the optical output of the device. Antenna's used in wireless communications range from directional such as Panel, Yagi or Grid antennas (for direct and point to point communication) to omnidirectional such as Dipole or Fiberglass antennas (for communication from a central node or access point to a scattered area around the periphery of the device). The embodiments described in this invention are not meant to restrict the type of antenna contemplated as each type serves a purpose for the application. For example, LED lighting for interior use are many times centrally placed to disperse light in a more omnidirectional pattern and therefore typically would also have an omnidirectional antenna.

The LED heat sink housing material in accordance with this disclosure is made out of a thermally conductive and electrically nonconductive material. As used herein, the term electrically nonconductive means a volume resistivity of more than about $10^3$ ohm-centimeters (ohm-cm). In preferred embodiments, the electrically nonconductive material has a volume resistivity of greater than about $10^7$ ohm-cm. In still further preferred embodiments, the electrically nonconductive material has a volume resistivity of greater than $10^{10}$ ohm-cm. Exemplary materials include ceramics of various kinds but in preferred embodiments are injection moldable plastics and, in especially preferred embodiments are thermally conductive injection moldable plastics that are electrically nonconductive with fillers in them that impart thermal conductivity as well as electrical insulation.

In some instances the whole housing/heat sink is made of this material. In other instances just a front bezel portion of the housing/heat sink is made out of these materials. The front bezel is the area around the LED lens and is the area where the antenna is typically housed for the wireless radio. By making the bezel portion out of an electrically nonconductive material, the rest of the body and part may be made out of electrically conductive materials or composites, such as thermally and electrically conductive plastics or metals. Exemplary thermally conductive plastics are described, for example, in U.S. Patent Application Publication No. 2011/0095690, published Apr. 28, 2011, the entire contents of which are incorporated herein by reference.

In certain embodiments, a decorative trim piece 213 is added to the LED device that mounts to the front bezel, and which could also act as a decorative piece whereby it is designed to come on or off. This way multiple trim pieces (e.g., various colors, designs, and so forth) could be provided that can be removably attached to the LED device and that can be changed by the user depending on the trim and other accents in an environment. For example, one could change out a purple bezel trim piece for a blue one based on the color of the room or other decorations done to the room. The trim piece does not interfere with the function of light output or LED device performance since it is formed of a material having a high volume resistivity (e.g., preferably 108 ohm-cm or higher) and would serve in a decorative capacity.

In one embodiment, the entire heat sink is molded out of a thermally conductive plastic having a volume resistivity greater than $10^3$ ohm-cm, preferably greater than $10^7$ ohm-cm, and more preferably greater than $10^{10}$ ohm-cm volume resistivity.

In a preferred embodiment of the present disclosure, the wireless antenna is insert molded into the heat sink housing along with the populated LED printed circuit board (PCB) during the manufacture/molding of the heat sink housing of the LED device. The heat sink housing herein may be over molded with the PCB, for example, in accordance with the aforementioned commonly owned U.S. Patent Application Publication No. 2011/0095690, which is incorporated herein by reference in its entirety. The material used should have a minimum thermal conductivity of at least 1 watt per meter kelvin (W/mK) and preferably has a thermal conductivity of at least 4 W/mK. The material should also have a volume resistivity of about $10^3$ ohm-cm, preferably greater than $10^7$ ohm-cm, and more preferably greater than $10^{10}$ ohm-cm volume resistivity. This would eliminate any assembly requirements of the antenna, while also allowing the antenna to be moved out of the way of interference with optics or other components of the LED device. This would also provide longer range for the wireless antenna as compared to traditional antenna mounting with conventional EMI or wireless signal interfering heat sink materials.

In a second embodiment, an upper portion of the heat sink is molded out of a thermally conductive plastic having a volume resistivity of less than about $10^5$ ohm-cm and with a thermal conductivity of at least 1 W/mK and preferably has a thermal conductivity of at least 4 W/mK. The heat sink upper portion is molded and LEDs attached. Preferably, the heat sink upper portion is overmolded onto the LED PCB as described in the aforementioned U.S. Patent Application Publication No. 2011/0095690. The heat sink is only molded up to the PCB of the LEDs and does not include the front lower heat sink/bezel portion of the LED device. The molded upper housing portion, preferably containing the LED circuit board is then inserted into another mold and the lower heat sink housing/bezel part is molded on in a two shot molded process/ fashion with a thermally conductive plastic having a volume resistivity greater than $10^3$ ohm-cm, preferably greater than $10^7$ ohm-cm, and more preferably greater than $10^{10}$ ohm-cm, and a thermal conductivity of about 0.2 W/mK or greater.

In still further embodiment, the assembly operation could be reversed whereby the lower heat sink housing is molded first and the upper heat sink housing is molded second.

In yet another embodiment, the upper and lower heat sink housing components are two separately molded parts that are fitted together to form an integrated part.

In a further embodiment, making the upper portion of the LED device with a material having a volume resistivity of less than about $10^5$ ohm-cm and containing fillers that are electrically conductive and non-metallic, creates an upper LED device housing in which the driver and radio are housed, that shield out EMI/RFI caused by the electronics in the driver or radio of the LED device. Typically there are significant cost and design limitations of electronic drivers associated with shielding EMI/RFI frequencies to comply with FCC electronic emission standards.

In yet another embodiment, the LED device also includes electronics housed inside that transform the LED device into a Wi-Fi hub whereby it could be used to provide Wi-Fi connections to Wi-Fi enabled devices where the wireless enabled LED lights are located. For example, the LED device may include a Wi-Fi repeater or extender which detects an existing wireless network and extends the range of the network and reduces connectivity problems based on the range of the existing wireless routers or connectivity problems due to the walls and floors of the building. This would allow broader connection capability and data transmission for computers and devices that are Wi-Fi enabled to send and receive data transmissions. This would provide connectivity in areas that might otherwise be out of Wi-Fi range. With the LED device manufactured in this disclosure made out of a thermally conductive material that preferably has a volume resistivity of greater than approximately $10^3$ ohm-cm and, more preferably, greater than $10^7$ ohm-cm, and ideally greater than $10^{10}$ ohm-cm, Wi-Fi communications could be significantly enhanced and made possible.

Figure 2A:
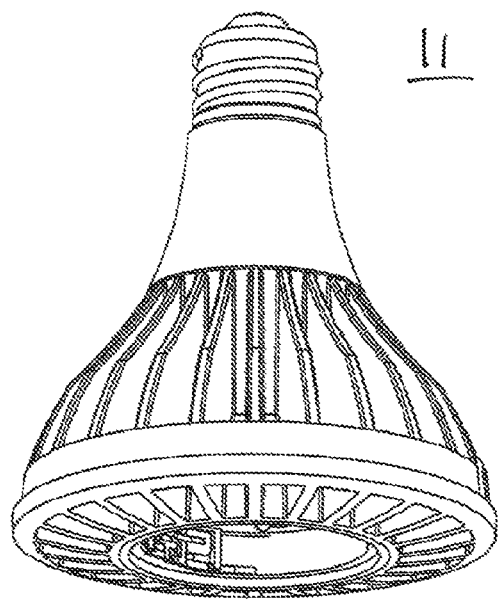
FIG. 2A-2B shows an LED device according to a first exemplary embodiment herein.
Figure 2B:
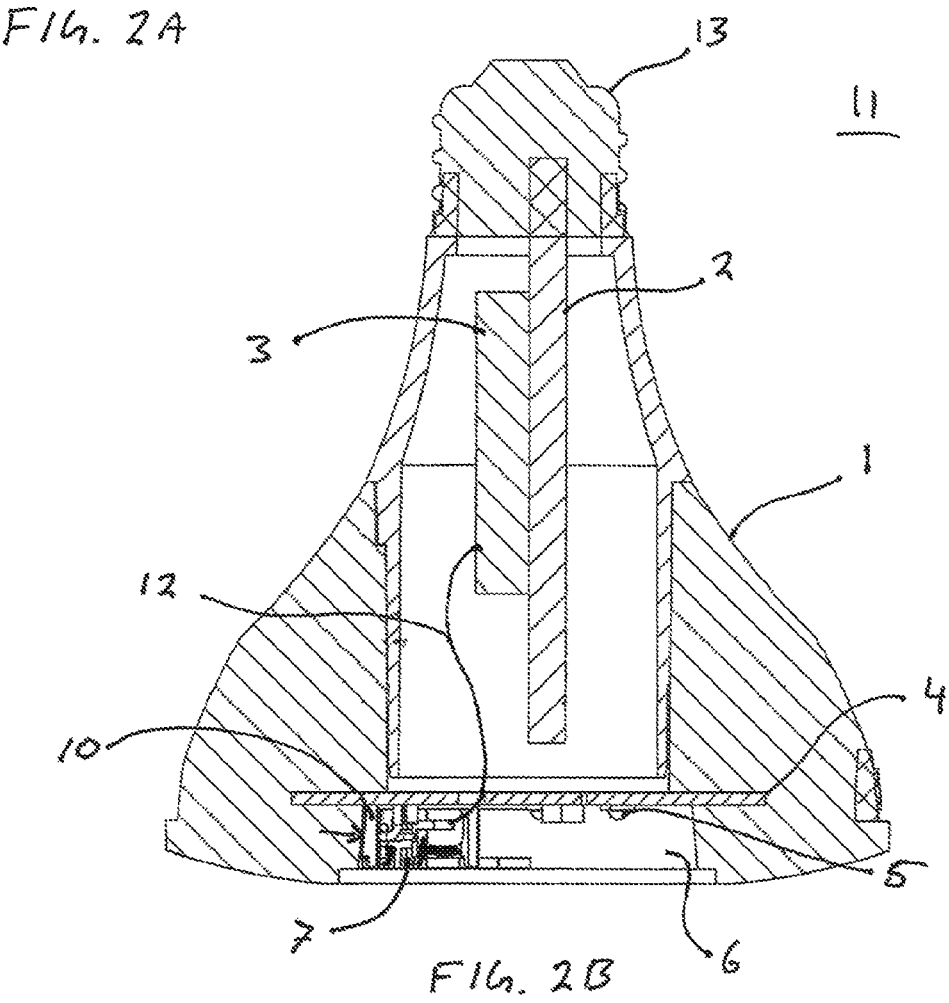
Figure 6A:
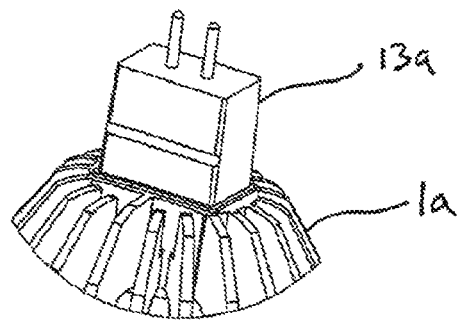
FIGS. 6A-6C illustrate several exemplary alternative embodiments of the LED device.
Figure 6B:
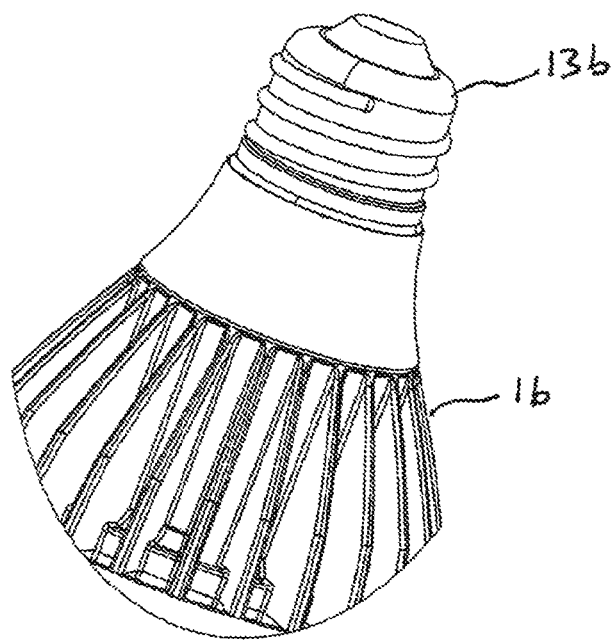
Figure 6C:
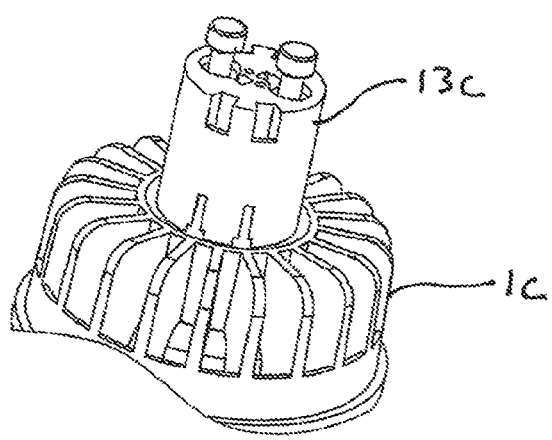

FIG. 2B shows an LED device 11 according to an exemplary embodiment herein, including a heat sink housing molded of a material 1 having a volume resistivity of $10^3$ ohm-cm or higher and a thermal conductivity of greater than 1 W/mK. A metal core printed circuit board (MCPCB) 4 is insert molded into 1 during the manufacturing process as described in the aforementioned Publication No. 2011/0095690. 2 represents the LED device power supply with 3 the wireless radio in close connection and proximity to the power supply. An optic 6 is placed into the opening in housing 1 and over the LED 5 in the LED device to focus the light as desired in the LED device design or for a particular lighting application. Wireless antenna 7 is placed against (or within extremely close proximity of) the surface of housing 1 with a distance 10 of zero or close to zero inches. This prevents antenna 7 from blocking optical light output from the LED 5 due to its location within the optic 6. This also makes assembly easier, as the antenna 7 may be attached and produced in many more shapes and configurations and, for example, may be more optimized for the particular LED device 11 or the manufacturing process used therefor. Wireless antenna 7 is connected to wireless radio 3 by an antenna connection such as a coaxial or other type 12. In some cases the power supply 2 may be connected to a connector 13 for connecting the LED device 11 to a lighting fixture. Alternatively, the connector 13 for connection to a light fixture may be a separate module. In the depicted embodiment, the connector 13 is shown as a Edison type connector. It will be recognized that any other connector for connecting the LED device apparatus to a light fixture may be employed. For example, FIG. 6A illustrates a second embodiment LED apparatus 1a having a Bi-Pin GU5.3 low voltage connector 13a. FIG. 6B illustrates a third embodiment LED apparatus 1b having an Edison base 13b. FIG. 6C illustrates a fourth embodiment LED lighting apparatus 1c having a GU10 for line voltage, 110 or higher voltage connection.

Figure 3:
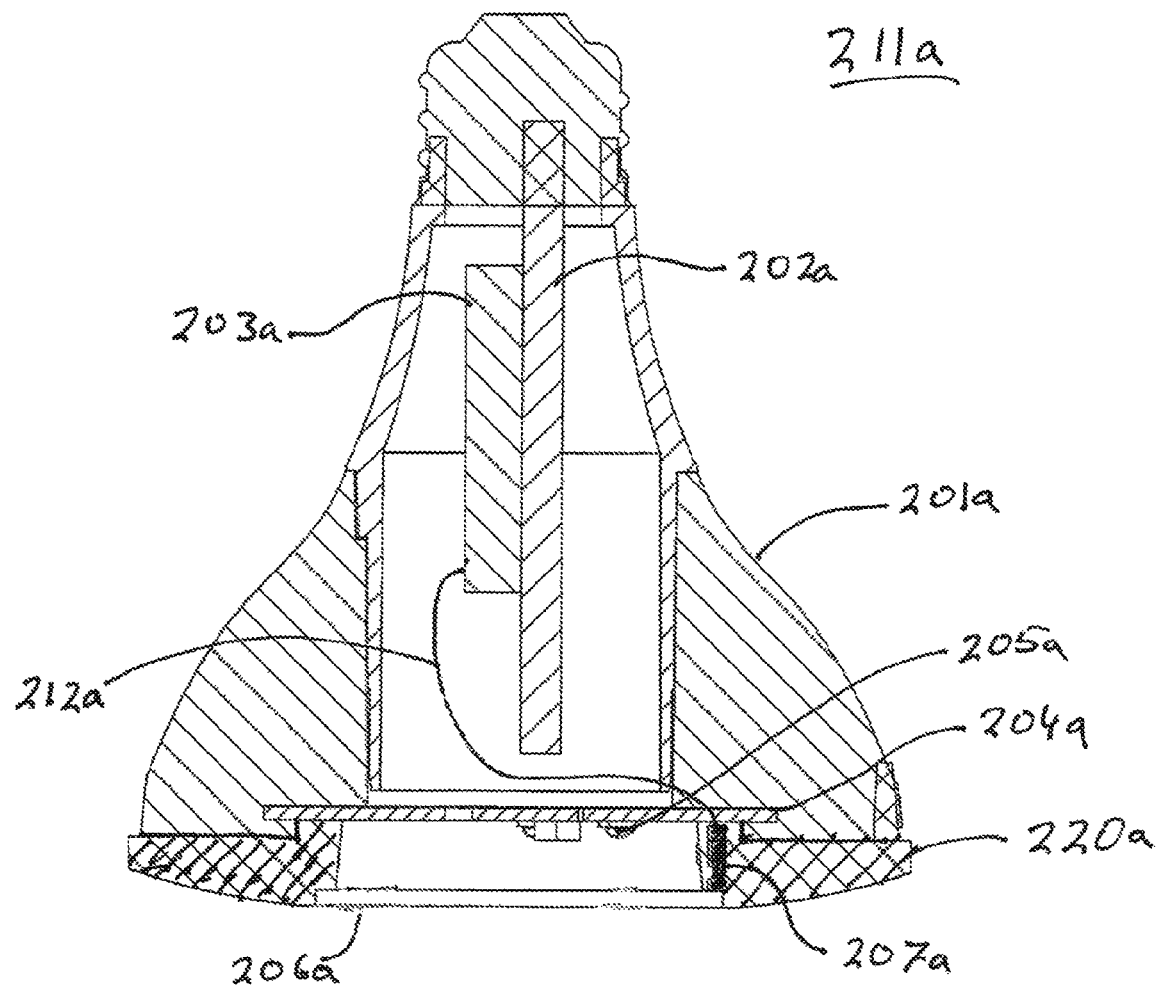
FIG. 3 shows an LED device according to a second exemplary embodiment herein.
Figure 4:
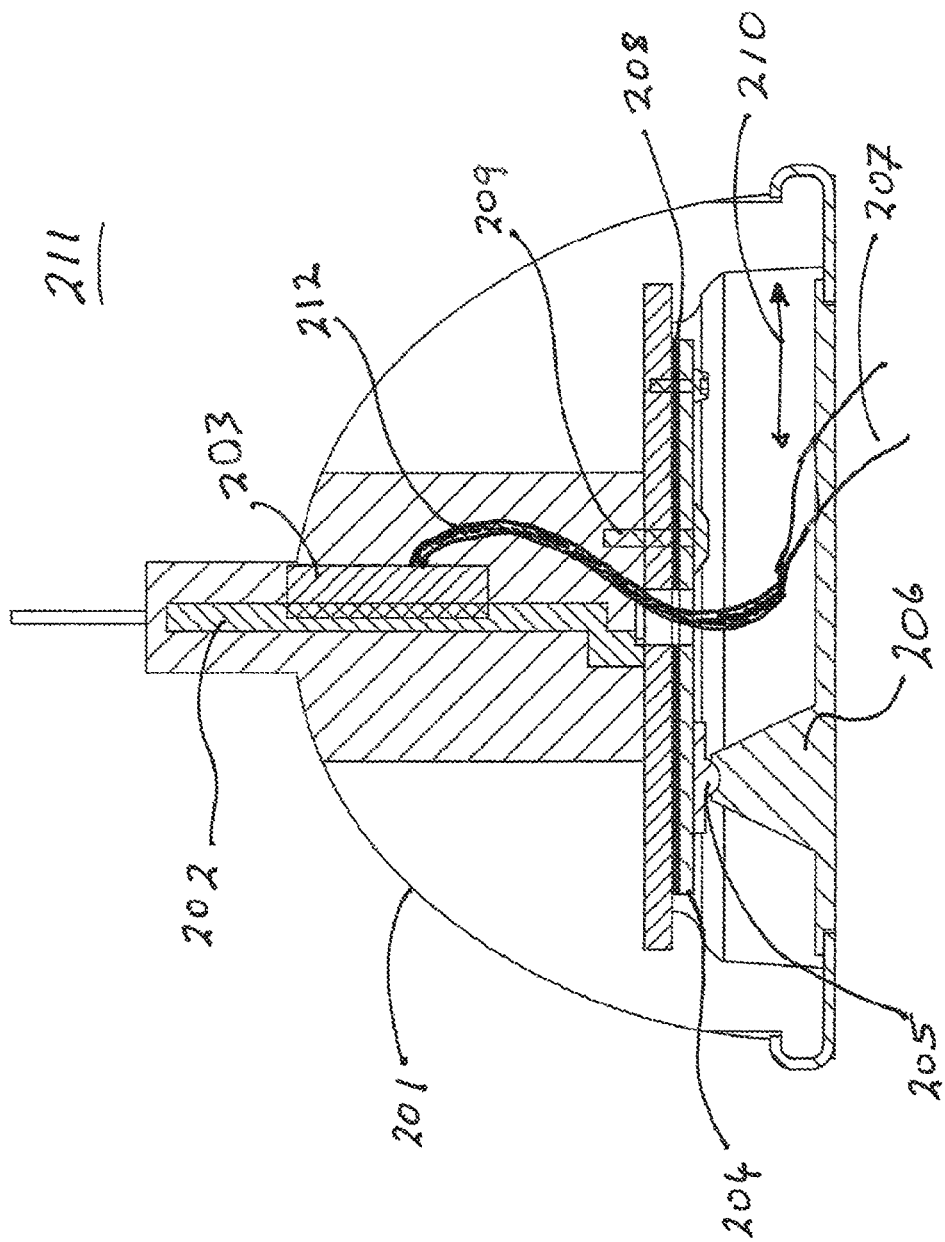

FIG. 3 shows an alternative embodiment LED device 211a with an upper heat sink housing portion 201a molded onto a populated MCPCB 204a (e.g., produced via an overmolding process as described in Publication No. 2011/0095690). LED 205a is mounted on the MCPCB 204a and produces light that shines through and is focused by optic 206a. In this embodiment, the wireless antenna 207a is molded into a second lower heat sink housing portion 220a which, in turn, is molded onto portion 201a. Alternatively, the lower or bezel portion 220a may be made in a separate process and the sections 201a and 220a may be glued together. Alternatively, the lower portion 220a could be molded onto the populated MCPCB 204a and the upper portion 200a could be molded onto the lower portion 220a. 202a represents the LED device power supply with 203a the wireless radio in close connection and proximity to the power supply. The wireless radio 203a is connected to the wireless antenna 207a by a connection 212a. It is contemplated that other variations or combination of assemblies could be achieved and that only a few by example are shown here. Those skilled in the art realize this and therefore recognize that not all combinations are shown.

Figure 5A:
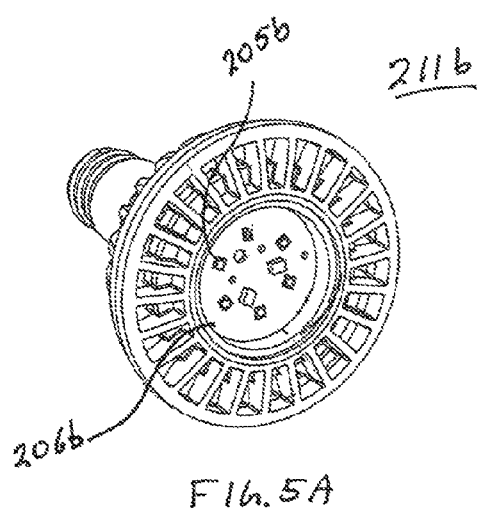
FIG. 5A-5B shows an LED device according to a third exemplary embodiment herein.
Figure 5B:
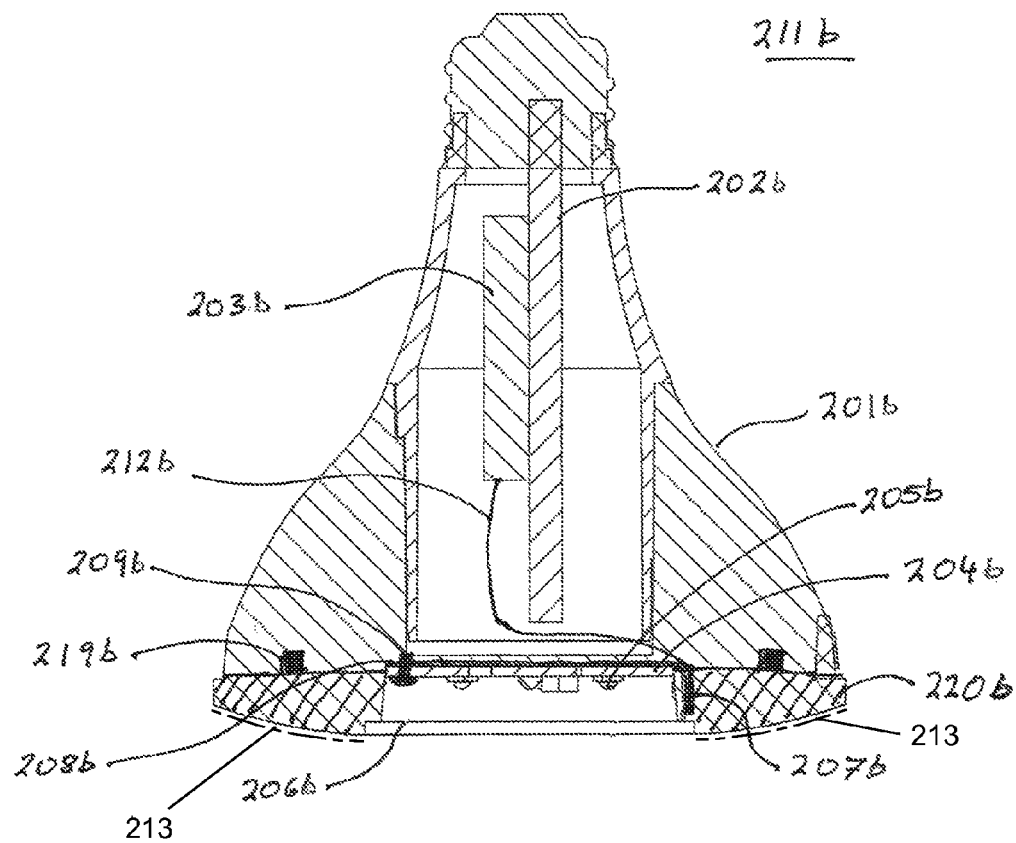

FIG. 5A-5B shows an alternative embodiment LED device 211b with an metal upper heat sink housing portion 201b attached with screws 209b and thermal interface 208b to a populated MCPCB 204b. LED 205b is mounted on the MCPCB 204b and produces light that shines through and is focused by optic 206b. In this embodiment, the wireless antenna 207b is molded into a lower Bezel portion 220b which, in turn, is attached onto portion 201b via a snap fit 219b. Alternatively, the lower bezel 220b may be made in a separate process and the sections 201b and 220b may be glued together. Alternatively, the lower portion 220b could be molded onto the populated MCPCB 204b and the upper portion 201b could be attached to the lower portion 220b. 202b represents the LED device power supply with 203b the wireless radio in close connection and proximity to the power supply. It is contemplated that other variations or combination of assemblies could be achieved and that only a few by example are shown here.

Exemplary thermally conductive and electrically insulating materials useful for injection molding thermally conductive electrically insulating plastic LED heat sink housings or bezels herein comprise:

1) 20%-80% by weight of a polymer matrix; and
2) 20%-80% by weight of electrically insulating, thermally conductive filler.

The polymer composition may further comprise of 5%-50% of a reinforcing material which also acts as a thermally conductive filler as well as flame retardants, lubricants or other material compatibilizers such as silicones or others. The polymer matrix may be a thermoplastic, epoxy or thermosetting resin material. For example, the polymer matrix can be selected from Polycarbonate or Liquid Crystalline Polymer (LCP) or Nylon.

The thermally conductive and electrically insulating filler could be any such material. For example it could be aluminum oxide, calcium oxide, aluminum nitride, boron nitride, zinc oxide, structural glass, clay or any mixtures thereof. The reinforcing materials could be glass, clay, inorganic materials, or other. Exemplary compositions may be as follows:

Resins: Polyphenylene Sulfide (PPS), Nylon, Polycarbonate (PC), LCP, Polycarbonate/Acrylonitrile Butadiene Styrene (PC/ABS) others.

Fillers: Boron Nitride, Aluminum Oxide, Aluminum Nitride, E-glass, Nano ceramics, carbon flakes and ceramic coated carbon flakes, carbon flakes, others.

Loading level example: 40% Boron Nitride, 10% e-glass, 59% PPS, 1% other.

Loading level example: 40% e-glass, 10% minerals, 10% clay, 40% PPS.

Preferred filler loadings: As low as 5% for fillers imparting thermal conductivity, preferably 30% and as high as 80%.

A suitable injection molded thermally conductive electrically insulating material may also be made up of a combination of fillers that are electrically conductive and electrically insulating as long as the resulting matrix properties are insulating sufficiently electrically so as to not cause interference with the wireless radio antenna and may be generally comprised of the following:

1) 20%-80% by weight of a polymer matrix;
2) 20%-80% by weight of an electrically insulating, thermally conductive filler; and
3) 5-50% by weight of an electrically conductive, thermally conducting filler.

The polymer composition may further comprise of 5%-50% of a reinforcing material which also acts as a thermally conductive filler as well as flame retardants, lubricants or other material compatibilizers such as silicones or others.

The polymer matrix may be a thermoplastic, epoxy, thermosetting resin. For example, the polymer matrix can be selected from Polycarbonate or Liquid Crystalline Polymer or Nylon.

The thermally conductive electrically and insulating filler could be any such material. For example it could be aluminum oxide, calcium oxide, aluminum nitride, boron nitride, zinc oxide, structural glass, clay or any mixtures thereof. The reinforcing materials could be glass, clay, inorganic materials or other.

The thermally conductive electrically conductive filler could be any such material. For example, it could be carbon fibers, graphite flakes, carbon black, carbon nanotubes, aluminum flake, copper flake, or any other mixture thereof. Exemplary compositions may be as follows:

Resins: PPS, Nylon, PC, LCP, PC/ABS others.

Fillers: Boron Nitride, Aluminum Oxide, Aluminum Nitride, E-glass, Nano ceramics, carbon flakes and ceramic coated carbon flakes, carbon flakes, others.

Loading level example: 40% Boron Nitride, 10% e-glass, 59% PPS, 1% other.

Loading level example: 40% e-glass, 10% minerals, 10% clay, 40% PPS.

Loading level example: 10% e-glass, 20% graphite flakes, 20% boron nitride, 50% PC.

Preferred filler loadings: As low as 5% for fillers imparting thermal conductivity, preferably 30% and as high as 80%.

FIGS. 3 and 5 show LED lighting devices having a PAR 30 form factor with an Edison base. It will be recognized, however, that the present invention may be adapted for use with all manner of light bulb form factors (e.g., MR16, MR11, PAR38, and others) and all manner of bases, including other screw bases, bi-pin and other pin type connectors, bayonet sockets, and so forth as shown by example in FIG. 7A-7C.

In certain embodiments, the antenna is directly plated onto the lamp housing or bezel, in view of the electrically insulative properties of the housing or bezel. This eliminates the need for a separate antenna wire and simplifies manufacturing. The plated on antenna is electrically connected to the radio board, e.g., through a simple solder or connector connection. The antenna can be plated at any of a variety of locations. For example, in some embodiment it is plated on an interior side wall of the front bezel part of the LED device housing. Alternatively, it may be plated on a ledge molded into the housing. In other embodiments, it is plated on the top outer surface of the housing. In still other embodiments, it may plated and placed anywhere that is thought by those skilled in the art to be the most effective location for a particular LED lighting device design.

In certain embodiments, the external antenna is eliminated altogether and the antenna is imbedded directly on the radio network interface PCB through a plated circuit design. In such embodiments, there needs to be no antenna mounted or placed on the LED device housing or front bezel section. Due to the electrically insulating nature of the LED device housing (FIG. 1A) and/or front bezel (FIG. 2B), the thermally conductive housing or bezel would create little to no interference and the antenna is able to communicate without the need for an additional secondary antenna or an extension protruding out of the housing. The network interface radio printed circuit could be located on the same PCB as the LED, placed next to the LED. The network interface radio printed circuit board is preferably located within the housing, next to the driver circuit board.

In certain embodiments, the antenna component is directly insert molded into the lamp housing or bezel, given to the electrically insulative properties of the housing or bezel. This eliminates the need for a separate assembly operation and simplifies manufacturing. The antenna is then electrically connected to the radio board through a simple solder or connector connection. In some embodiments, the antenna is molded on an interior side wall of the front bezel part of the LED device housing. In other embodiments, it is molded on a ledge molded into the housing. In still other embodiments, it is molded on the top outer surface of the housing. Because the present thermally conductive housing eliminates or reduces EMI/shielding, the antenna can be molded and placed anywhere that is thought by those skilled in the art to be the most effective location for a given LED design. In embodiments wherein the antenna is embedded within the heat sink housing or positioned on an exterior surface of the heat sink housing, an electrically conductive via extending through the heat sink housing may be provided to electrically couple the antenna to the RF transceiver.

The electrically insulating material properties of the heat sink/housing/bezel allow the antenna shape to be optimized for higher performance, range and operation. The present development provides more freedom and flexibility to locate the antenna, given the lack of interference from the LED device heat sink/housing/bezel. Thus, the antenna shape can be optimized for range, communication frequency and more importantly for its manufacturing. In prior art devices, many antennas are restricted or limited in terms of shape or type because of the need to keep them away from the metal/electrically conductive housings. The present invention allows for a variety of optimized shapes without shielding or interference concerns of interference with optical output. Exemplary antenna shapes include oval, round, FIG. 8, bowtie, straight, and other shapes.

In certain embodiments, the housing assembly includes an integrated motion sensor H (see FIG. 7) with the above optimizations for sensing room or area occupancy. This could be, for example, an added trigger to help turn on/off and control the LED device. Flexibility in terms of the location and function of the sensor is enhanced due to the materials used in the LED device housing/bezel. Sensors that sense motion or activity by electrical activity may be used with the lighting devices herein due to the electrically insulative material used in the housing/bezel.

In certain embodiments, the housing assembly includes an integrated Oxygen sensor J (see FIG. 7) with the above optimizations for sensing room or area occupancy. This could be, for example, an added trigger to help turn on/off and control the LED device. Flexibility in terms of the location and function of the sensor is enhanced due to the materials used in the LED device housing/bezel. Sensors that sense motion or activity by electrical activity may be used with the lighting devices herein due to the electrically insulative material used in the housing/bezel.

In certain embodiments, the housing assembly includes an integrated camera K (see FIG. 7) with the above optimizations for sensing room or area occupancy, security such as break in or vandalism or other security requirements. This could be, for example, an added trigger to help turn on/off and control the LED device during certain hours of operation. Cameras that sense motion or activity by electrical activity may be used with the lighting devices herein due to the electrically insulative material used in the housing/bezel.

Other sensor elements which could be included with or associated with the LED devices herein include: a temperature sensor for detecting ambient temperature within a detection area adjacent to the LED lighting device to measure and transmit temperature value; a Wi-Fi hub to extend range or wireless connection to other wireless devices for purposes of monitoring and control and communication; an RFID sensor for detecting RFID tags for location and tracking personal and materials; a GPS sensor for detecting and tracking location of LED lighting for operation, service, repair and replacement; and a $CO_2$ sensor for detecting amount of $CO_2$ in the detection area for purposes of monitoring and control and operable to dim down or turn off the LED lighting device if no human levels of $CO_2$ are detected in the detection area.

The housing assembly could have an integrated daylight sensor I (see FIG. 7) with the above optimizations for sensing time of day or ambient lighting, e.g., to help turn on/off or dim the lights due to levels of ambient light. This could be an added trigger to help turn on/off and control the LED device. Flexibility in terms of the location and function of the sensor is enhanced due to the materials used in the LED device housing/bezel. Sensors that sense ambient light/daylight by electrical activity may be used due to the electrically insulative material used in the housing/bezel.

Figure 7:
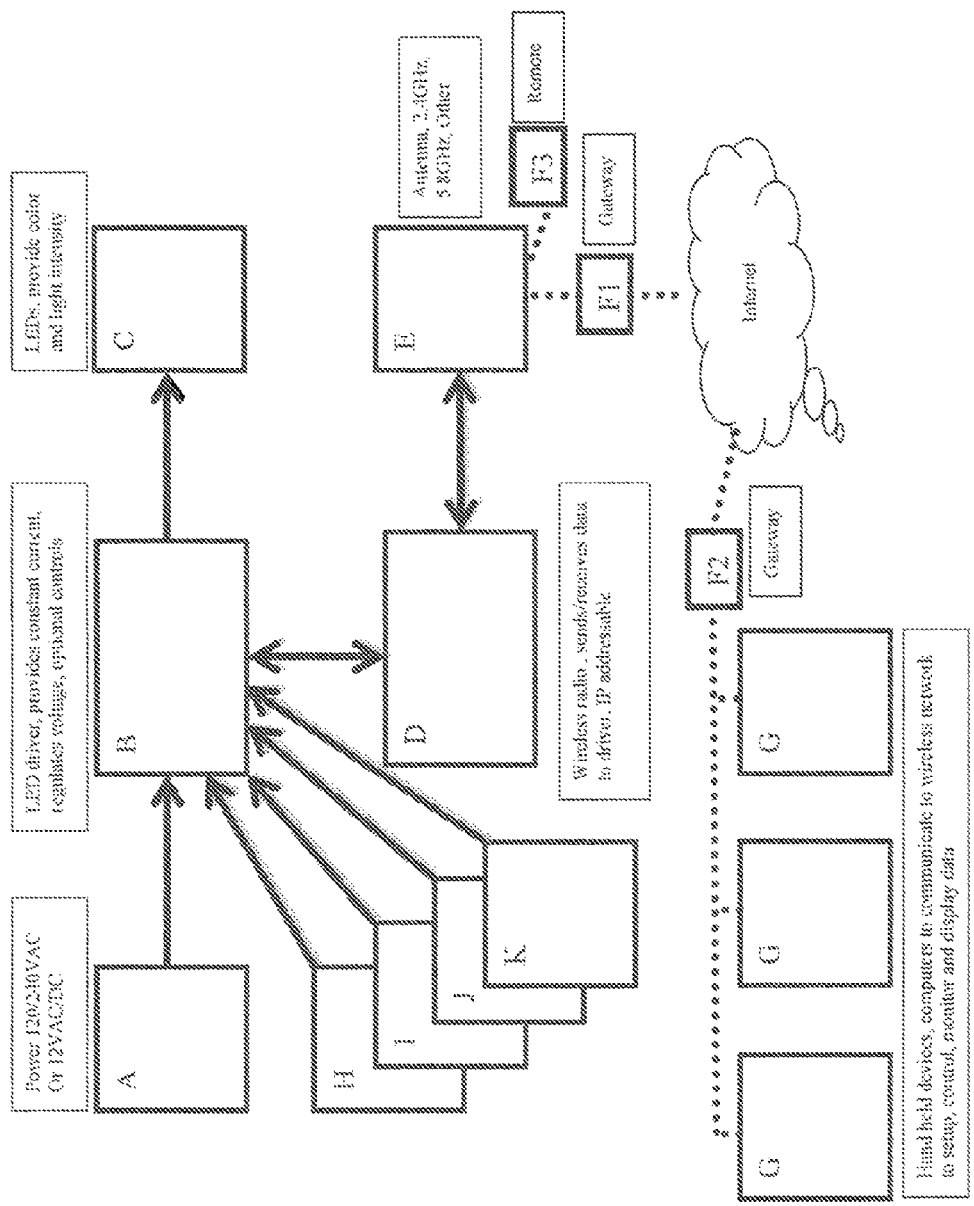
FIG. 7 shows an exemplary networked system incorporating a wireless LED lighting device in accordance with the present disclosure.

FIG. 7 depicts an exemplary system operable to embody the present lighting devices with wireless driver. The source power A may be AC or DC, and may be for example, AC mains power of the structure in which the lighting devices herein are installed. The LED(s) driver B converts the source power to the DC voltage required by the LEDs and provides a constant current to the LED(s) C. A 2.4 GHz to 5.8 GHz wireless radio network interface D sets and receives parameters to the LED(s) driver B. The antenna E accepts the wireless signals from a wireless remote control F3 or gateway device F1, which also interfaces to the Internet. Remote wireless computers G send and receive data through a wireless gateway F2 to the Internet.

While the embodiments described herein are the presently preferred embodiments, various modifications can be made without departing from the spirit and scope of the invention.

Having thus described the preferred embodiments, the invention is now claimed to be:

1. An LED lighting device, comprising:
   a light emitting assembly including at least one LED;
   a wireless network interface coupled to the light emitting assembly and connecting the LED lighting device to a network, the wireless network interface including a radio frequency transceiver;
   an antenna in electrical communication with the radio frequency transceiver; and
   a thermally conductive housing receiving said light emitting assembly, the thermally conductive housing in thermal communication with said at least one LED, wherein said thermally conductive housing is formed of a thermally conductive and electrically nonconductive material, the thermally conductive and electrically nonconductive material configured to reduce or eliminate electromagnetic shielding, wherein said thermally conductive housing is configured to dissipate heat directly into ambient air, and further wherein said light emitting assembly includes an LED circuit structure attached directly into said thermally conductive housing.

2. The LED lighting device of claim 1, wherein the thermally conductive housing is formed of a non-metal based material.

3. The LED lighting device of claim 1, wherein the thermally conductive housing is formed of a thermally conductive, electrically nonconductive plastic.

4. The LED lighting device of claim 1, wherein the antenna is attached directly to the thermally conductive housing.

5. The LED lighting device of claim 1, further comprising:
a printed circuit board received within said thermally conductive housing and having said at least one LED mounted thereto, wherein the antenna is located on the printed circuit board.

6. The LED lighting device of claim 1, wherein the antenna does not block optical output of the LED lighting device during operation.

7. The LED lighting device of claim 1, wherein the antenna is in direct contact with an interior surface of the thermally conductive housing.

8. The LED lighting device of claim 1, wherein the antenna is selected from:
an antenna molded into the thermally conductive housing; and
an antenna plated onto a surface of the thermally conductive housing.

9. The LED lighting device of claim 1, further comprising:
an electronic circuit board having a peripheral portion and a central portion that is radially inward of said peripheral portion, said at least one LED mounted on an exterior side of the electronic circuit board central portion, and said thermally conductive housing being overmolded onto said peripheral portion.

10. The LED lighting device of claim 1, wherein the thermally conductive housing is formed of a material having a volume resistivity of greater than 1,000 ohm-cm.

11. The LED lighting device of claim 10, wherein the thermally conductive housing is formed of a material having a thermal conductivity of greater than 1 W/mK.

12. The LED lighting device of claim 1, wherein the thermally conductive housing has a plurality of fins disposed around the thermally conductive housing.

13. The LED lighting device of claim 1, wherein the thermally conductive and electrically nonconductive material is a composite material comprising 20%-80% by weight of a polymer matrix and 20%-80% by weight of an electrically insulating, thermally conductive filler.

14. The LED lighting device of claim 1, wherein the thermally conductive and electrically nonconductive material is a composite material comprising 20%-80% by weight of a polymer matrix; 20%-80% by weight of an electrically insulating, thermally conductive filler; and 5-50% by weight of an electrically conductive, thermally conducting filler.

15. The LED lighting device of claim 1, further comprising one or more sensor modules selected from at least one of:
a motion sensor for detecting motion within a detection area adjacent the LED lighting device and operable to turn off the LED lighting device if no motion is detected in the detection area;
an ambient light sensor for sensing light intensity in the detection area and operable to adjust an illumination intensity of said at least one LED responsive to sensed light intensity in the detection area to achieve a desired level of brightness;
a temperature sensor for detecting ambient temperature within a detection area adjacent to the LED lighting device to measure and transmit temperature value;
a Wi-Fi hub to extend range or wireless connection to other wireless devices for purposes of monitoring and control and communication;
an RFID sensor for detecting RFID tags for location and tracking personal and materials;
a GPS sensor for detecting and tracking location of LED lighting for operation, service, repair and replacement;
a $CO_2$ sensor for detecting amount of $CO_2$ in the detection area for purposes of monitoring and control and operable to dim down or turn off the LED lighting device if no human levels of $CO_2$ are detected in the detection area; and
an IP camera sensor and/or interface for image capture, monitoring and transmission for security and identification.

16. An LED lighting device, comprising:
a light emitting assembly including at least one LED;
a wireless network interface coupled to the light emitting assembly and connecting the LED lighting device to a network, the wireless network interface including a radio frequency transceiver;
a thermally conductive housing receiving said light emitting assembly, the thermally conductive housing in thermal communication with said at least one LED;
said thermally conductive housing being configured to dissipate heat into ambient air and having a first portion attached to a second portion;
the first portion formed of a first material and defining an interior cavity receiving the wireless network interface and the second portion formed of a second material, the first material being a thermally conductive material;
the second portion formed of a second material defining an aperture allowing optical output of the at least one LED to pass therethrough during operation, the second material being an electrically nonconductive material, the thermally conductive and electrically nonconductive material configured to reduce or eliminate electromagnetic shielding, wherein said light emitting assembly includes an LED circuit structure attached directly into said thermally conductive housing and further wherein said second portion is configured to dissipate heat directly into ambient air; and
an antenna in electrical communication with the radio frequency transceiver.

17. The LED lighting device of claim 16, wherein the antenna is received in said aperture.

18. The LED lighting device of claim 16, wherein the first material is selected from a metal, a metal alloy, and a thermally conductive, electrically conductive plastic, and the second material is selected and formed from an electrically nonconductive plastic and a thermally conductive, electrically non-conductive plastic.

19. The LED lighting device of claim 16, further comprising:
an electronic circuit board having a peripheral portion and a central portion that is radially inward of said peripheral portion, said at least one LED mounted on an exterior side of the electronic circuit board central portion, and said first portion being overmolded onto said peripheral portion.

20. The LED lighting device of claim 16, further comprising:
a decorative trim piece removably attached to the lower portion for giving the LED lighting device a desired finished appearance, the decorative trim piece formed of an electrically nonconductive material.

* * * * *